United States Patent
King et al.

(10) Patent No.: US 10,056,776 B2
(45) Date of Patent: Aug. 21, 2018

(54) SYSTEM AND METHOD FOR DETECTING THE CONDITION OF A ROBOTIC CHARGING CONNECTOR

(71) Applicant: Fetch Robotics, Inc., San Jose, CA (US)

(72) Inventors: Derek King, San Jose, CA (US); Michael Ferguson, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 225 days.

(21) Appl. No.: 15/096,855

(22) Filed: Apr. 12, 2016

(65) Prior Publication Data

US 2017/0294784 A1 Oct. 12, 2017

(51) Int. Cl.
*H02J 7/00* (2006.01)
*G01K 13/00* (2006.01)

(52) U.S. Cl.
CPC .............. *H02J 7/007* (2013.01); *G01K 13/00* (2013.01); *H02J 7/0052* (2013.01)

(58) Field of Classification Search
CPC ........................................................ H02J 7/00
USPC ........................................................ 320/107
See application file for complete search history.

(56) References Cited

U.S. PATENT DOCUMENTS

| | | | |
|---|---|---|---|
| 2013/0238129 A1* | 9/2013 | Rose | F04B 9/10 700/258 |
| 2014/0207282 A1* | 7/2014 | Angle | H04L 12/282 700/257 |
| 2016/0266577 A1* | 9/2016 | Kerzner | G05D 1/0022 |
| 2017/0225336 A1* | 8/2017 | Deyle | G08B 13/196 |
| 2017/0294784 A1* | 10/2017 | King | H02J 7/007 |

* cited by examiner

Primary Examiner — Mohammed Alam
(74) Attorney, Agent, or Firm — J. Steven Svoboda

(57) ABSTRACT

A system includes: a robotic charging connector including: a temperature sensor configured to measure temperature data; a processor operably connected to the temperature sensor, the processor configured to use the temperature data to determine an appropriate charging current, wherein the processor is further configured to send an alert upon occurrence of a triggering condition; and a computer operably connected to the processor, the computer configured to control the robotic charging connector, the computer further configured to receive the alert. A method for detecting the condition of a robotic charging connector includes: receiving, by a processor from a temperature sensor to which the processor is operably connected, the temperature sensor configured to measure a temperature of the robotic charging connector, temperature data; determining, by the processor, based on the temperature data, that a triggering condition has occurred; and sending, by the processor, to a computer, notification regarding the triggering condition.

10 Claims, 2 Drawing Sheets

SYSTEM AND METHOD FOR DETECTING THE CONDITION OF A ROBOTIC CHARGING CONNECTOR

PRIORITY CLAIM

The present application claims the priority benefit of U.S. provisional patent application No. 62/146,392 filed Apr. 12, 2015 and entitled "System and Method for Detecting the Condition of a Robotic Charging Connector," the disclosure of which is incorporated herein by reference.

SUMMARY

Embodiments of this invention relate in general to a system and method for detecting a condition of a connector.

A system includes: a robotic charging connector including: a temperature sensor configured to measure temperature data; and a processor operably connected to the temperature sensor, wherein the processor is configured to use the temperature data to determine an appropriate charging current, wherein the processor is further configured to send an alert upon occurrence of a triggering condition; and a computer operably connected to the processor, the computer configured to control the robotic charging connector, the computer further configured to receive the alert from the processor.

A system includes: a robotic charging connector including: a temperature sensor configured to measure temperature data; and an electronic circuit operably connected to the temperature sensor, wherein the electronic circuit is configured to perform a pre-designated action upon occurrence of a triggering condition.

A method for detecting the condition of a robotic charging connector includes: receiving, by a processor from a temperature sensor to which the processor is operably connected, the temperature sensor configured to measure a temperature of the robotic charging connector, temperature data; determining, by the processor, based on the temperature data, that a triggering condition has occurred; and sending, by the processor, to a computer, notification regarding the triggering condition.

A method for detecting the condition of a charging connector for a robot includes: receiving, by a computer that is operably connected to a processor, the processor operably connected to a temperature sensor, the temperature sensor configured to measure temperature data regarding the robotic charging connector, from the processor, an alert that a triggering condition has occurred; and sending, by the computer, a notification to one or more of an administrator and a robot maintainer that the triggering condition has occurred.

A method for detecting the condition of a robotic charging connector, comprising: receiving, by a computer that is operably connected to a robotic system comprising two or more robots, from the system, temperature data; building, by the computer, using the temperature data, a profile of one or more of the behavior of the charging connector and the life cycle of the charging connector; and tuning, by the computer, using the profile, the robotic system.

DETAILED DESCRIPTION

Figure 1:
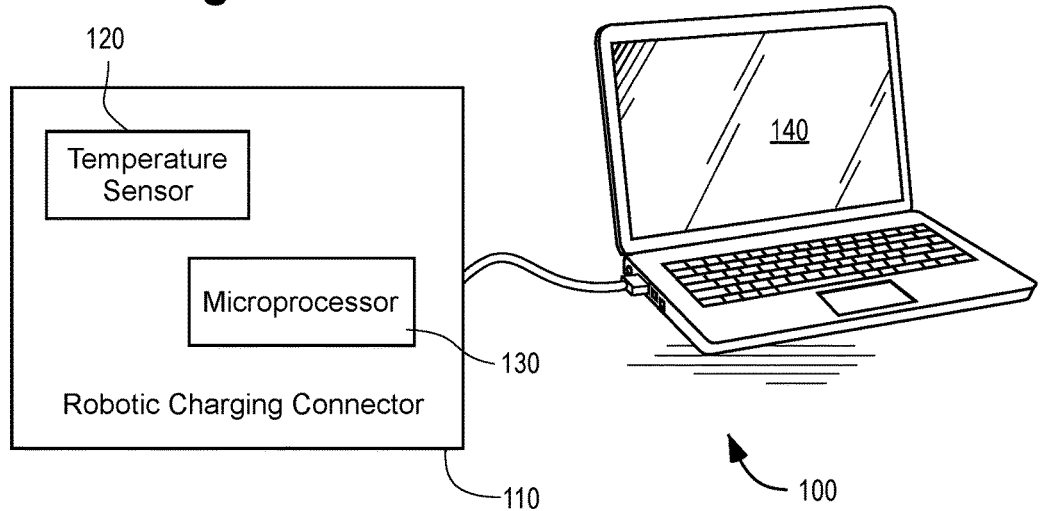
FIG. 1 is a block diagram of a system for detecting a condition of a robotic charging connector.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The system for detecting the condition of a robotic charging connector includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

Embodiments of this invention relate in general to a system and method for detecting a condition of a connector, and more particularly to a system and method for detecting a condition of a robotic charging connector, and still more particularly to a system and method for detecting deterioration of a robotic charging connector.

According to embodiments of the invention, a robotic charging connector comprises a temperature sensor. For example, the temperature sensor comprises a thermistor. For example, the temperature sensor comprises a solid state temperature sensor.

According to further embodiments of the invention, the robotic charging connector further comprises a processor that is operably connected to the temperature sensor. For example, the processor is physically coupled to the temperature sensor. For example, the processor is wirelessly coupled to the temperature sensor. For example, the processor is operably connected to the temperature sensor through another operable connection. For example, the temperature data comprises one or more of a temperature and a temperature profile.

For example, the processor comprises a microprocessor. The processor uses the temperature data to determine an appropriate charging current. For example, the appropriate charging current ensures that the robotic charging connector does not exceed a temperature threshold. For example, the processor determines that the robotic charging connector has likely been damaged by noting an increase, relative to previous charging cycles, in a temperature of the charging connector.

According to additional embodiments of the invention, the processor is operably connected to a computer configured to control the robotic charging connector, the processor being configured to send an alert to the computer upon occurrence of a triggering condition. For example, a triggering condition comprises one or more of deterioration of a robotic charging connector, a need for service of the robotic charging connector, a need for replacement of the robotic charging connector, presence of a pre-selected temperature threshold, and presence of a pre-selected temperature profile. For example, one or more of the pre-selected temperature threshold and the pre-selected temperature profile is set using pre-set criteria. For example, the triggering condition's occurrence is determined using pre-set criteria.

For example, the processor is operably connected to the computer over a network. For example, the processor is operably connected to the computer over a wireless network. For example, the processor is operably connected to the computer over a non-wireless network. For example, the computer comprises a log server. For example, the computer comprises a computer other than a log server.

For example, the computer is operably connected over a network to one or more of an administrator and a robot maintainer. For example, upon receiving an alert, the computer sends a notification to the one or more of an administrator and a robot maintainer that the triggering condition has occurred.

According to alternative embodiments of the invention, the processor sends the temperature data to the computer. According to additional embodiments of the invention, the computer is configured to determine, using the temperature data, if the robot is out of specification.

According to further embodiments of the invention, the computer may analyze temperature data provided by a robotic system comprising two or more robots. Accordingly, such embodiments of the invention may facilitate building a detailed profile of one or more of the behavior of the charging connector and the life cycle of the charging connector. According to yet other embodiments of the invention, the computer may be configured to tune the robotic system using the detailed profile. According to still further embodiments of the invention, tuning may comprise adjusting an expected life cycle of a robot. Alternatively or additionally, according to yet other embodiments of the invention, tuning may comprise adjusting a service recommendation for a robot. For example, the service recommendation was previously provided by the robotic system.

Alternatively or additionally, according to still other embodiments of the invention, rather than the robotic charging connector comprising a processor that is operably connected to the temperature sensor, the robotic charging connector comprises an electronic circuit operably connected to the temperature sensor. For example the electronic circuit is discrete from a charging circuit comprising the robotic charging connector. For example, the discrete electronic circuit is coupled to the temperature sensor.

The discrete electronic circuit is configured to perform a pre-designated action upon occurrence of the triggering condition. For example, upon occurrence of the triggering condition, the discrete electronic circuit alters a charging current. For example, upon occurrence of the triggering condition, the discrete electronic circuit reduces the charging current. For example, upon occurrence of the triggering condition, the discrete electronic circuit interrupts the charging circuit. For example upon occurrence of the triggering condition, the discrete electronic circuit trips a circuit breaker. For example, upon occurrence of the triggering condition, the discrete electronic circuit performs another pre-designated action.

FIG. 1 is a drawing showing components of a system 100 for detecting the condition of a robotic charging connector. The system 100 includes a robotic charging connector 110. The robotic charging connector 110 includes a temperature sensor 120 configured to measure temperature data, and a processor 130 operably connected to the temperature sensor 120. The processor 130 is configured to use the temperature data to determine an appropriate charging current. The processor 130 is further configured to send an alert upon occurrence of a triggering condition. The system 100 further includes a computer 140 operably connected to the processor 130. The computer 140 is configured to control the robotic charging connector 110. The computer 140 is further configured to receive the alert from the processor 130. For example, the processor 130 transmits an instruction to the computer 140 to ensure that an appropriate charging current flows.

Figure 2:
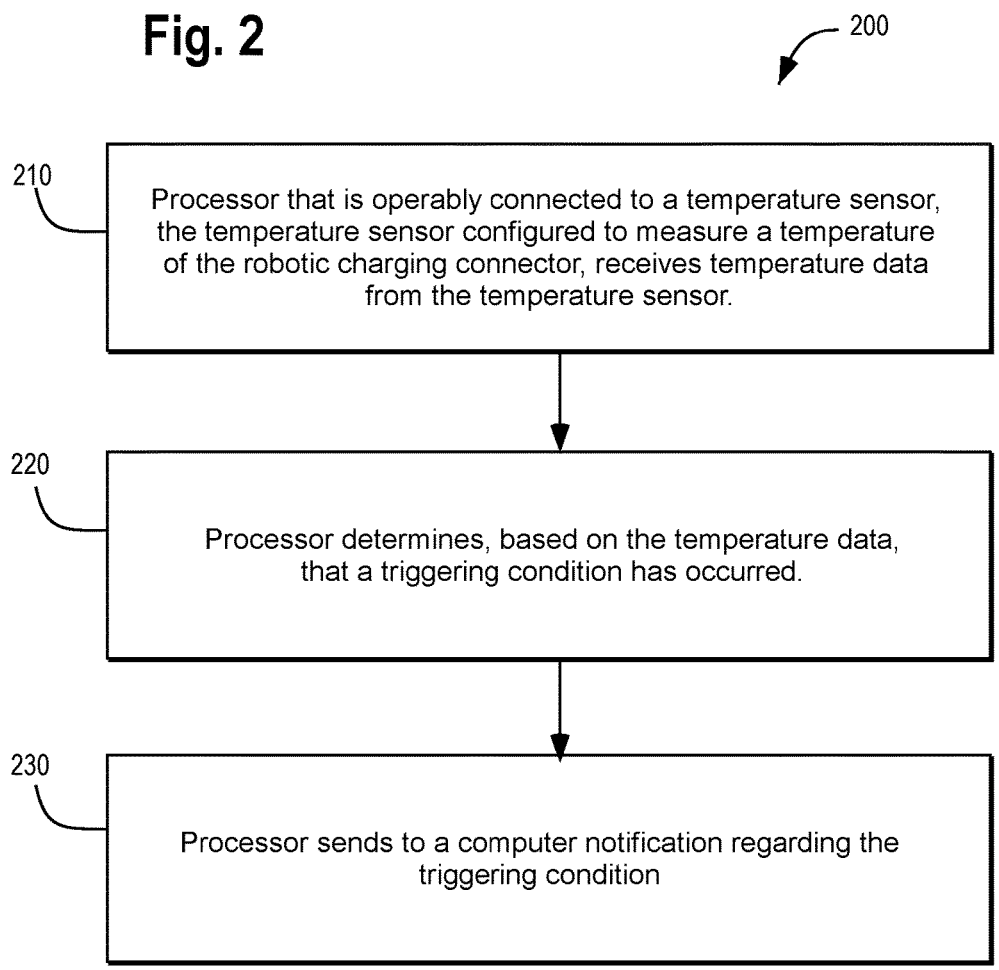
FIG. 2 is a flow chart of a method for detecting the condition of a robotic charging connector.

FIG. 2 is a flow chart of a method 200 for detecting the condition of a robotic charging connector.

The order of the steps in the method 200 is not constrained to that shown in FIG. 2 or described in the following discussion. Several of the steps could occur in a different order without affecting the final result.

In step 210, a processor that is operably connected to a temperature sensor, the temperature sensor configured to measure a temperature of the robotic charging connector, receives temperature data from the temperature sensor. Block 210 then transfers control to block 220.

In step 220, the processor determines, based on the temperature data, that a triggering condition has occurred. Block 220 then transfers control to block 230.

In step 230, the processor sends to a computer notification regarding the triggering condition. Block 230 then terminates the process.

Figure 3:
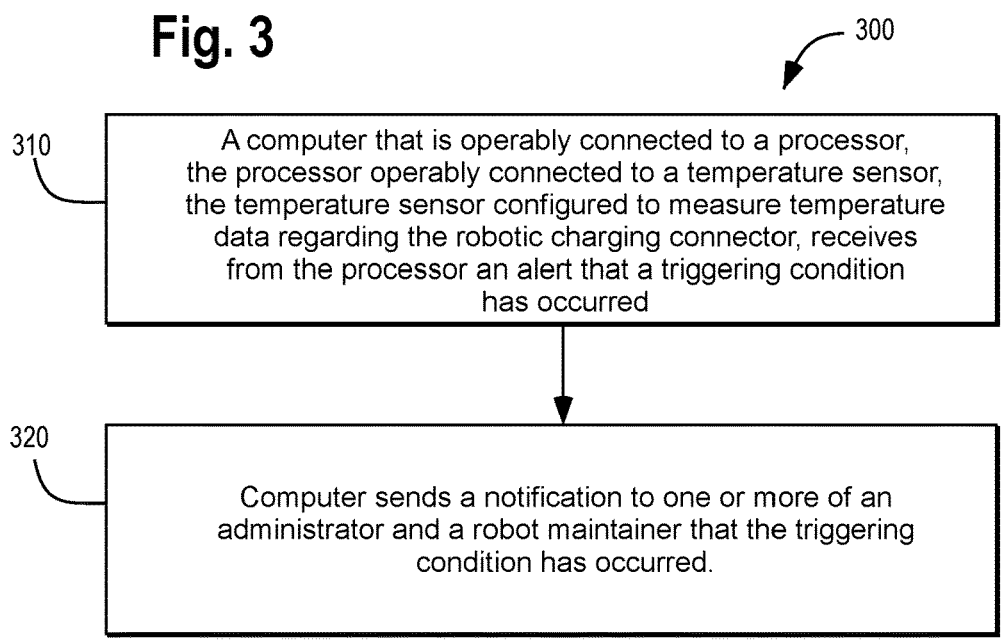
FIG. 3 is a flow chart of a method for detecting the condition of a robotic charging connector.

FIG. 3 is a flow chart of a method 300 for detecting the condition of a robotic charging connector.

The order of the steps in the method 300 is not constrained to that shown in FIG. 3 or described in the following discussion. Several of the steps could occur in a different order without affecting the final result.

In step 310, a computer that is operably connected to a processor, the processor operably connected to a temperature sensor, the temperature sensor configured to measure temperature data regarding the robotic charging connector, receives from the processor an alert that a triggering condition has occurred. Block 310 then transfers control to block 320.

In step 320, the computer sends a notification to one or more of an administrator and a robot maintainer that the triggering condition has occurred. Block 320 then terminates the process.

Figure 4:
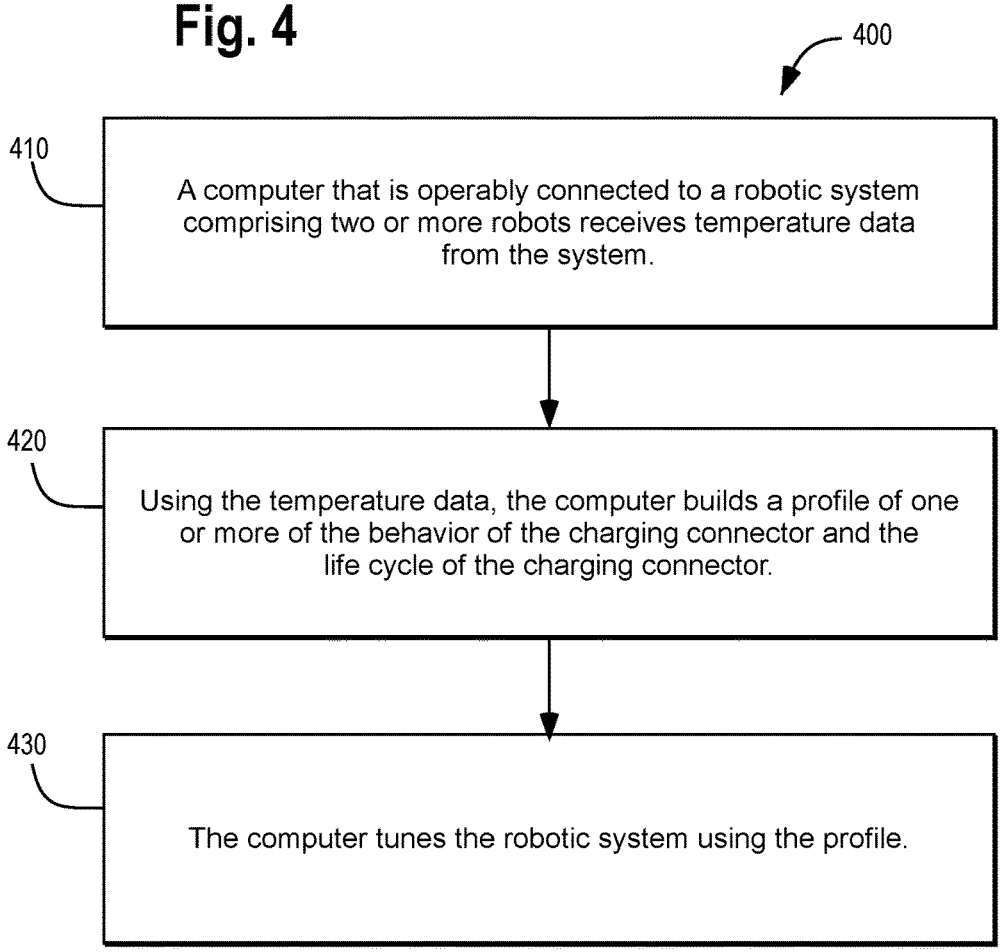
FIG. 4 is a flow chart of a method for detecting the condition of a robotic charging connector.

FIG. 4 is a flow chart of a method 400 for detecting the condition of a robotic charging connector.

The order of the steps in the method 400 is not constrained to that shown in FIG. 4 or described in the following discussion. Several of the steps could occur in a different order without affecting the final result.

In step 410, a computer that is operably connected to a robotic system comprising two or more robots receives temperature data from the system. Block 410 then transfers control to block 420.

In step 420, using the temperature data, the computer builds a profile of one or more of the behavior of the charging connector and the life cycle of the charging connector. Block 420 then transfers control to block 430.

In step 430, the computer tunes the robotic system using the profile. Block 430 then terminates the process.

For example, it will be understood by those skilled in the art that software used by the system and method for detecting the condition of a robotic charging connector may be located in any location in which it may be accessed by the system. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention. For example, the computer comprises the processor. For example, the processor comprises the computer.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A system comprising:
    a robotic charging connector comprising:
        a temperature sensor configured to measure temperature data; and
        a processor operably connected to the temperature sensor,
            wherein the processor is configured to use the temperature data to determine an appropriate charging current,
            wherein the processor is further configured to send an alert upon occurrence of a triggering condition,
            wherein the processor uses the temperature data to determine an
            appropriate charging current,
            wherein the processor determines that the robotic charging connector has likely been damaged by noting an increase, relative to previous charging cycles, in a temperature of the charging connector;
    a computer operably connected to the processor, the computer configured to control the robotic charging connector, the computer further configured to receive the alert from the processor.

2. The system of claim 1, wherein the temperature data comprises one or more of a temperature and a temperature profile.

3. The system of claim 1, wherein the processor is physically coupled to the temperature sensor.

4. The system of claim 1, wherein the processor is wirelessly coupled to the temperature sensor.

5. The system of claim 1, wherein the processor determines a charging current that ensures that the robot charging connector does not exceed a temperature threshold.

6. The system of claim 1, wherein the processor determines a charging current that ensures that the robot charging connector does not exceed a temperature threshold.

7. The system of claim 1, wherein the triggering condition comprises one or more of deterioration of a robotic charging connector, a need for service of the robotic charging connector, a need for replacement of the robotic charging connector, presence of a pre-selected temperature threshold, and presence of a pre-selected temperature profile.

8. The system of claim 1, wherein the computer is configured, upon receiving the alert, to send a notification to one or more of an administrator and a robot maintainer that the triggering condition has occurred.

9. The system of claim 1, wherein the computer is configured to receive the temperature data from the processor.

10. The system of claim 8, wherein the computer is configured to determine, using the temperature data, if the robot is out of specification.

* * * * *

UNITED STATES PATENT AND TRADEMARK OFFICE
CERTIFICATE OF CORRECTION

PATENT NO. : 10,056,776 B2
APPLICATION NO. : 15/096855
DATED : August 21, 2018
INVENTOR(S) : Derek King It is certified that error appears in the above-identified patent and that said Letters Patent is hereby corrected as shown below:

On the Title Page

Please add item (60) after item (22):
"Related U.S. Application Data
Provisional application No. 62/146,392, filed on April 12, 2015."

Signed and Sealed this
Twenty-third Day of August, 2022

Katherine Kelly Vidal
*Director of the United States Patent and Trademark Office*